United States Patent
Keaton et al.

(10) Patent No.: US 9,016,477 B2
(45) Date of Patent: Apr. 28, 2015

(54) METHOD AND SYSTEM FOR PROCESSING SLAG MATERIAL

(71) Applicant: Mid-American Gunite, Inc., Newport, MI (US)

(72) Inventors: Donald E. Keaton, Saint Clairsville, OH (US); Keith P. Masserant, Newport, MI (US); Lawrence I. Masserant, Newport, MI (US)

(73) Assignee: Mid-American Gunite, Inc., Newport, MI (US)

( * ) Notice: Subject to any disclaimer, the term of this patent is extended or adjusted under 35 U.S.C. 154(b) by 2 days.

(21) Appl. No.: 13/757,147

(22) Filed: Feb. 1, 2013

(65) Prior Publication Data
US 2013/0240415 A1 Sep. 19, 2013

Related U.S. Application Data

(60) Provisional application No. 61/612,627, filed on Mar. 19, 2012.

(51) Int. Cl.
| | | |
|---|---|---|
| *B03C 1/30* | (2006.01) | |
| *B03C 1/00* | (2006.01) | |
| *B03B 9/04* | (2006.01) | |

(Continued)

(52) U.S. Cl.
CPC ... *B03C 1/00* (2013.01); *B03B 9/04* (2013.01); *B03C 1/30* (2013.01); *B03C 2201/20* (2013.01); *C22B 7/04* (2013.01); *C21B 3/06* (2013.01)

(58) Field of Classification Search
USPC .............. 209/38, 213, 214, 636, 659; 241/20, 241/24.14, 24.13, 24.15, 24.25
See application file for complete search history.

(56) References Cited

U.S. PATENT DOCUMENTS

| | | | |
|---|---|---|---|
| 1,729,008 A | 9/1929 | Osborne et al. | |
| 2,075,466 A | 3/1937 | Queneau | |

(Continued)

FOREIGN PATENT DOCUMENTS

| | | |
|---|---|---|
| DE | 20221285 U1 | 9/2005 |
| GB | 702314 A | 1/1954 |

(Continued)

OTHER PUBLICATIONS

Esser, Klaus-Reiner; "Road Construction Materials from Refuse Incineration" Aufbereitungs-Technik—Mineral Processing; May 1, 1998; pp. 243-246; vol. 39, No. 5; Bauverlag BV GmbH, DE.

(Continued)

*Primary Examiner* — Joseph C Rodriguez
*Assistant Examiner* — Kalyanavenkateshware Kumar
(74) *Attorney, Agent, or Firm* — Quinn Law Group, PLLC.

(57) ABSTRACT

A method and system is used to process slag material to yield by-products including a finished iron rich product and a finished low iron fines product. The by-products may include a finished high iron product and a finished medium iron product. The method and system include size classifying the material into a plurality of sized groups prior to using magnetic separation to separate at least one of the sized groups into two portions having differing magnetic susceptibilities. The method and system may include more than one phase of size classifying the material into a plurality of sized groups and using magnetic separation to separate at least one of the sized groups into portions, where the average size of the material remaining after one phase is reduced prior to the subsequent phase.

22 Claims, 3 Drawing Sheets

(51) Int. Cl.
*C22B 7/04* (2006.01)
*C21B 3/06* (2006.01)

(56) References Cited

U.S. PATENT DOCUMENTS

| | | |
|---|---|---|
| 2,971,703 A | 2/1961 | Rath |
| 3,438,495 A | 4/1969 | Turnock |
| 3,885,744 A | 5/1975 | Drage |
| 5,067,659 A | 11/1991 | Heeren et al. |
| 6,149,014 A | 11/2000 | Mankosa et al. |
| 6,258,150 B1 | 7/2001 | MacKellar |
| 7,810,746 B2 | 10/2010 | Gillis et al. |

FOREIGN PATENT DOCUMENTS

| | | |
|---|---|---|
| GB | 1253996 A | 11/1971 |
| JP | S60125332 A | 7/1985 |
| WO | 9108836 A1 | 6/1991 |
| WO | 2006041281 A2 | 4/2006 |

OTHER PUBLICATIONS

PCT Search Report mailed Apr. 18, 2013 for PCT application No. PCT/US2013/026115 filed Feb. 14, 2013.

METHOD AND SYSTEM FOR PROCESSING SLAG MATERIAL

CROSS-REFERENCE TO RELATED APPLICATIONS

This application claims priority to and the benefit of U.S. Provisional Patent Application No. 61/612,627, filed on Mar. 19, 2012, which is hereby incorporated by reference in its entirety.

TECHNICAL FIELD

The present invention relates generally to the processing of slag materials to provide products of differing iron content.

BACKGROUND

Numerous techniques may be used in various combinations to separate slag material, which is comprised of particles, into by-products of differing iron content. A number of factors affect the efficiency and effectiveness of each technique, including variability in the size, shape, metal content, chemical composition, friability, malleability, and magnetic susceptibility of the particles of the slag material. The economic feasibility of processing slag materials to recover usable products, which may include iron rich products suitable as charge stock to an iron or steel refining operation, for example, is dependent upon the iron content of the raw material, and the efficiency and effectiveness of the processing method used to separate the raw material into its by-products. Efficiency and effectiveness of the processing method may be compromised when the processing method is limited in flexibility, or where flexibility is expensive. For example, the flexibility of a fixed permanent magnet separator may be limited to the fixed strength and position of the permanent magnets within the separator. Using a magnetic separator including an electromagnet allows for adjustment of the strength of magnetic field used for separation, however at a significantly higher cost to power the electromagnet.

SUMMARY

A method and system is provided herein to process slag material to yield by-products, which may also be referred to herein as finished products, including at least a finished iron rich product and a finished low iron fines product. The method and system include size classifying the material into a plurality of sized groups prior to using magnetic separation to separate each of the sized groups into portions having differing magnetic susceptibilities, thereby increasing the effectiveness of the magnetic separation. In one example, the method and system includes size classifying the material into a plurality of sized groups and using magnetic separation to separate each of the sized groups into portions, including a low iron fines portion, removing the low iron fines portion, crushing and/or reducing the size of the particles in the remaining material, and size classifying the remaining material into another plurality of sized groups and using magnetic separation to separate each of the sized groups into portions, including a low iron fines portion and at least one other portion having an iron content above a specified level, where the other portion may be an iron rich product.

By size classifying the material into a plurality of sized groups prior to using magnetic separation to separate each sized group into portions, the efficiency and effectiveness of the magnetic separation may be increased, which may also reduce the total cost of processing the slag material to yield the by-products and reduce variability of certain characteristics of each by-product such as particle size and iron content.

In one example, the method includes using one or more adjustable magnetic separators, where the magnetic separator may be adjustable to achieve separation of the material at a predetermined level of magnetic susceptibility and/or iron content. An adjustable magnetic drum separator may be used to separate the material to provide at least one by-product with an iron content above a specified level. By adjusting the strength, e.g., the intensity, of the magnetic field at the separating surface of the magnetic separator according to the size of particles in the sized group and/or the predetermined minimum iron content desired, separation of particles having the predetermined minimum iron content can be efficiently accomplished. In one example, the adjustable magnetic separator may include a magnetic array positioned relative to a separating surface, wherein the magnetic array may be a permanent magnetic array. At least one of the positions of the magnetic array and the location of the separating surface may be adjustable with respect to the other, such that the distance between the magnetic array and the separating surface of the separator may be modified to adjust the intensity of the magnetic field at the separating surface where the magnetic particle separation occurs. The adjustable feature of the magnetic array allows the magnetic separator to be configured as an adjustable magnetic separator at substantially lower operating costs than, for comparison, a magnetic separator including a variable electromagnet.

The above features and other features and advantages of the present invention are readily apparent from the following detailed description of the best modes for carrying out the invention when taken in connection with the accompanying drawings.

DETAILED DESCRIPTION

Figure 1:
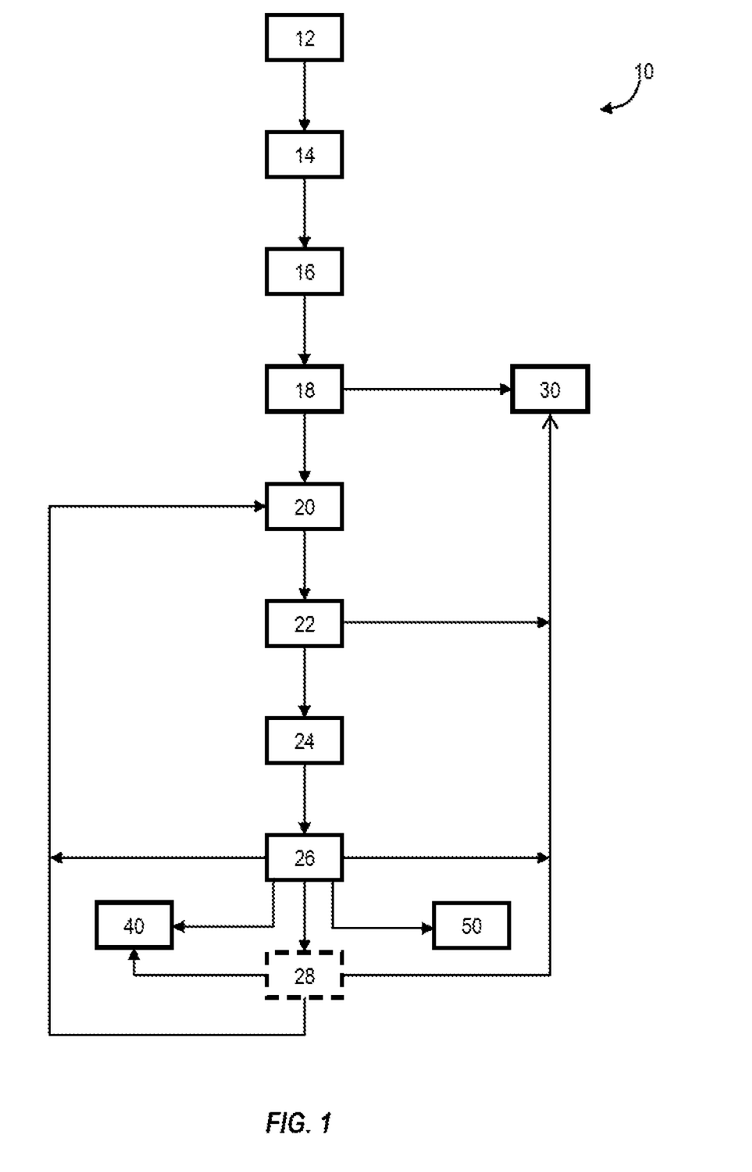
FIG. 1 is a flowchart of a method for separating slag materials into products having different iron content.
Figure 2:
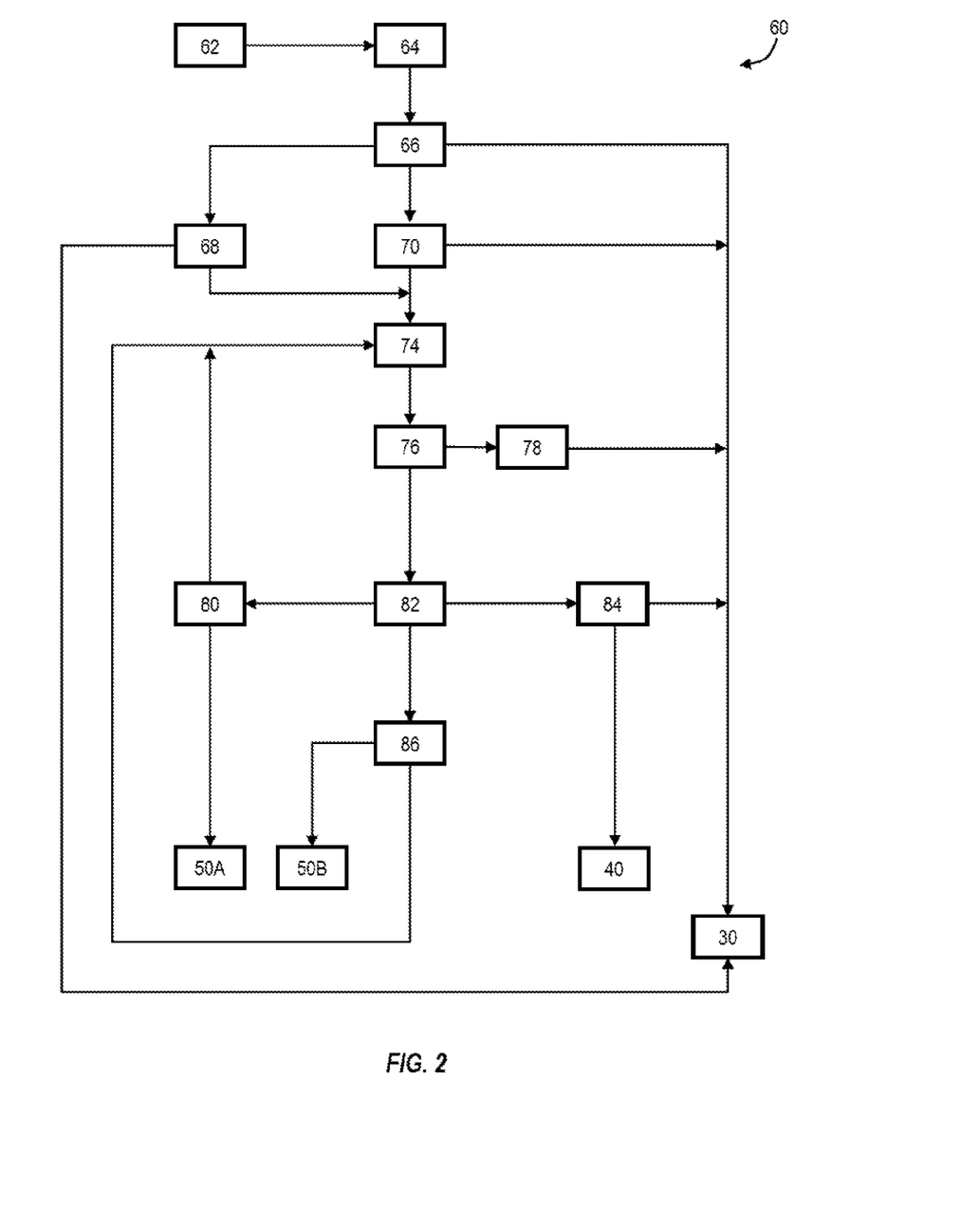
FIG. 2 is a schematic diagram of a first example system for performing the method of FIG. 1.
Figure 3:
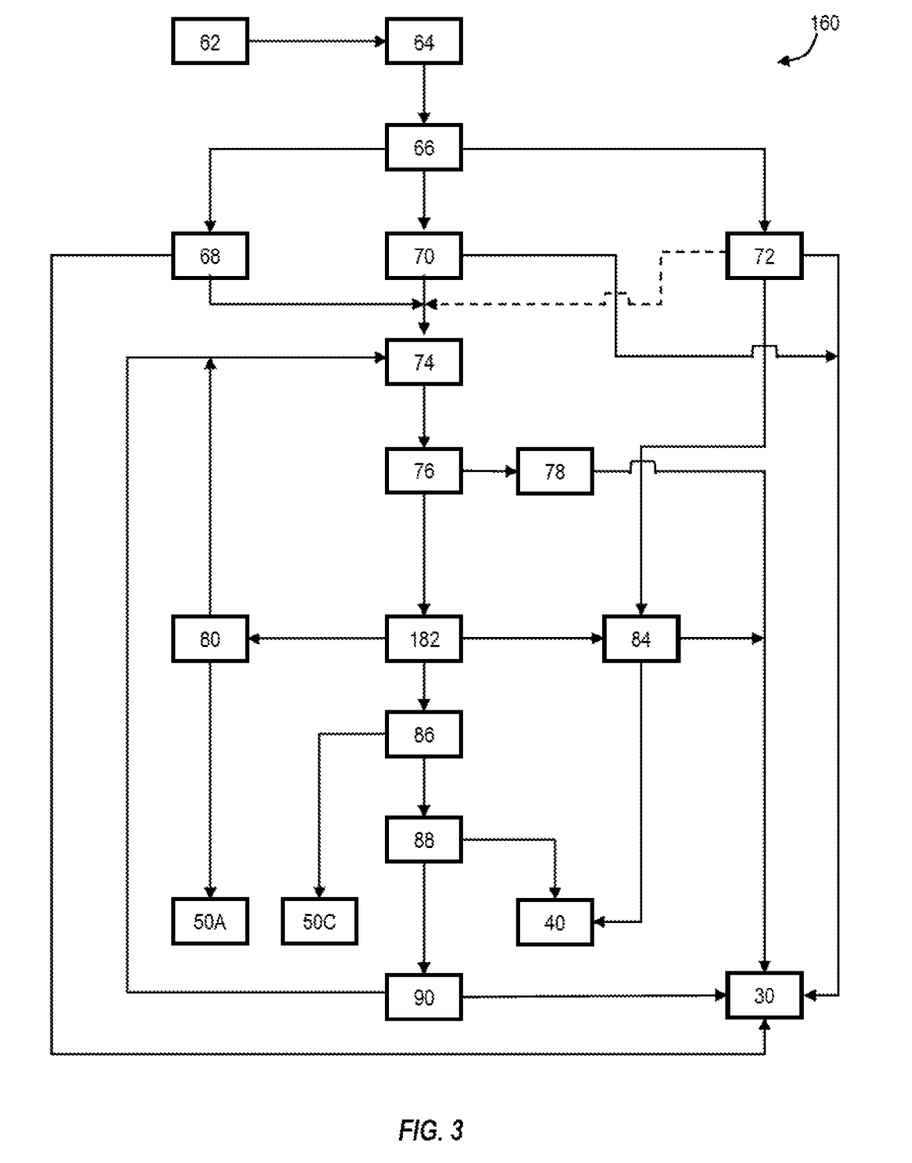
FIG. 3 is a schematic diagram of a second example system for performing the method of FIG. 1.

Referring to the drawings wherein like reference numbers represent like components throughout the several figures, there is shown in FIG. 1 a flowchart 10 of a method for separating slag materials into products having different iron content using a series of processing steps. FIG. 2 shows a first example system 60 to perform the method of FIG. 1, and FIG. 3 shows a second example system 160 to perform the method of FIG. 1. Referring to FIGS. 1, 2 and 3, and beginning with a loading or material handling step 12, raw material 62 (see FIGS. 2 and 3) is loaded into a feeding mechanism to be fed to a drying process at step 14. The raw material 62 may be a slag, slag-type, or slag-containing material. The slag included in the raw material 62 may be waste material from the steel and iron producing industry, and may include slag generated in a blast furnace, a converter, a basic oxygen furnace (BOF), or an electric furnace, and/or one or more of the types of slag commonly referred to as blast furnace slag, kish slag, c-scrap slag, desulfurization slag, and/or a combination of these. The raw material 62 may have a moisture content of 5 to 10% moisture as provided to the drying operation. In an example configuration, the raw material 62 may be transported by open gate dump style trucks (not shown) and loaded at step 12 into a feeding mechanism (not shown) to be provided to the drying process 14, or may be stored for a period of time prior to processing by the method and system described herein. The raw material 62 may be provided to the drying process 14 by any suitable material handling means for handling slag materials. For example, the raw material 62 may be picked up by articulating front end loaders (not shown) and placed in a hopper configured to discharge the raw material onto a feeding belt conveyor (not shown). The feeding belt conveyor may transfer the material to the drying step 14.

At step 14, the raw material 62 is dried using a dryer 64 (see FIGS. 2 and 3) to substantially remove the moisture from the surface of the raw material 62. In one example, the drying process may be configured to remove 99% of raw material surface moisture. The drying step 14 may be accomplished by any suitable means for the drying of slag or slag-type material. In one example, the drying step 14 may include loading the raw material 62 into a dryer 64 configured as a kiln style rotating sealed dryer, in which the raw material 62 may be tumbled, heated to an elevated temperature, dried and discharged to a size classifying step 16, either directly or using an intermediate feeding mechanism, such as a bucket elevator or conveyor. Heating and tumbling the raw material 62 during the drying step 14 may liberate iron containing particles in the raw material 62 from non-magnetic material or slag particles, due to particle to particle contact and impacting during the tumbling, thermal stressing of the raw material 62 by the elevated temperature, or a combination of these effects. For example, the iron containing particles are more malleable than the more brittle non-magnetic or slag portion of the raw material 62, such that tumbling the raw material 62 in the dryer 64 causes fracture and separation of the brittle non-magnetic slag portion from the more malleable iron containing particles, liberating the iron containing particles. The coefficient of thermal expansion of iron containing particles in the raw material 62 will differ from the coefficient of thermal expansion of the non-magnetic slag portion of the raw material 62, such that each of these constituents will expand and change size at different rates when exposed to the elevated temperature in the dryer 64. As an iron containing particle adhered to or included in non-magnetic slag material expands at a different rate than non-magnetic slag material adhered to or surrounding the iron containing particle, the thermal expansion and increased size of the iron containing particle imposes a stress on the non-magnetic slag which may be sufficient to cause separation or fracture of the iron containing particle from the slag material, thereby liberating the iron containing particle. Particle to particle contact during the tumbling of the raw material 62, in combination with the thermal stress factors, may further increase liberation of iron containing particles during the drying step 14.

At step 16, the substantially dry raw material 62 is separated using a size classifying process into a plurality of sized groups, such that each sized group generated by the size classifying step 16 is comprised of raw material particles within a specified size range. The number of sized groups and the particle size range specified or established for each of the sized groups may vary according from one lot or batch of raw material to another, and may be established based on characteristics such as the type of slag material, particle distribution within the batch of raw material 62, chemistry of the batch of raw material 62, etc. The size classifying step 16 may be performed using a screening system 66 (see FIGS. 2 and 3), which may be configured to separate the raw material 62 into the plurality of sized groups. In one example, the screening system 66 may include a double deck sifting screen, e.g., the screening system 66 may include a first and a second screen arranged such that the raw material 62 is fed to a first screen which retains particles in a first sized group and passes particles smaller than the first screen to the second screen. The second screen retains particles in a second sized group, and passes particles smaller than the second screen to be collected as a third sized group. The screening system 66 may be configured as a gyratory sifter, such as a SWECO™ Gyramax™ gyratory sifter. Each of the differently sized groups may be separately fed to a magnetic separation step 18 for further processing, as described herein.

In one example, the first screen of the sifter 66, which may also be referred to as the first deck, may be a 20 mesh screen, such that the first screen scalps off, e.g., screens or separates off, a first sized group substantially containing particles larger than +20 mesh from the raw material 62, and passes the remaining raw material, which may also be referred to as a remainder of the raw material 62, to the second screen. The second deck screen may be a 60 mesh screen, such that a second sized group substantially containing particles which range in size from minus 20 mesh to +60 mesh is scalped off using the second screen, and the remaining raw material is passed through the second screen and collected as a third sized group. The third sized group includes particles which are minus 60 mesh in size.

At step 18, each sized group is processed through a magnetic separator configured for that sized group and a predetermined iron content. Magnetic separation utilizes the force exerted by a magnetic field upon magnetic particles to attract the magnetic particles and/or to modify the trajectory of a falling magnetic particle by counteracting partially or wholly the effects of gravity and inertia with magnetic attraction of the falling magnetic particle to the magnetic field. Modifying the trajectory of the magnetic particles, e.g., those particles with sufficient iron content and magnetic susceptibility to be attracted to the magnetic field, allows for separation of the magnetic portion of the incoming material by affecting the trajectory of the magnetic particles into a path which allows for collection of these particles as a magnetic portion. Non-magnetic particles, e.g., those with insufficient iron content and/or insufficient magnetic susceptibility to be attracted to the magnetic field, will not be attracted to the magnetic field and/or will follow a trajectory determined by gravity and inertia and uninfluenced by the magnetic field, such that the non-magnetic particles generally follow a path which allows for collection of these particles as a non-magnetic portion. Characteristics such as the density, size, and iron content of each particle influence the trajectory of that particle, such two particles with dissimilar characteristics may exhibit the same trajectory, as may be the case where, for example, a heavier non-magnetic (lower iron) particle may follow substantially the same trajectory as a lighter magnetic (higher iron) particle being fed into a magnetic separator. Therefore, in a gravity fed magnetic separation process, such as that of a drum separator, material including a wide range of particle sizes may include heavier non-magnetic particles which may exhibit a similar trajectory to lighter magnetic particles and may be separated into the magnetic portion reducing the accuracy and effectiveness of the magnetic separation process, such that as the size range of the incoming material increases, the accuracy of the magnetic separation process decreases.

By size classifying the raw material 62 into a plurality of the sized groups with a limited range of particle size within each of the sized groups, then separately processing each of the sized groups through a magnetic separator, the influence of particle size variation on the effectiveness of the magnetic separation process is substantially reduced, and the accuracy of the magnetic separation process to separate magnetic from non-magnetic particles is increased.

The magnetic separation step 18 may be performed, as shown in the first example system 60 of FIG. 2, using a plurality of magnetic separating devices 68, 70, which may be configured as fixed magnetic separators. In the example shown, the magnetic separators 68, 70 may be configured as permanent magnet drum separators, where the magnet(s) providing the magnetic field may be in a fixed position with respect to the drum surface, wherein the drum surface defines a separating surface where magnetic particle separation occurs. The intensity of the magnetic field as the point of separation, e.g., the strength of the permanent magnet(s) and the fixed configuration of the permanent magnet(s) in each of the magnetic drum separators 68, 70, may differ. For example, the first magnetic drum separator 68 may be configured to separate the first sized group of particles, e.g., the +20 mesh sized group, into a first magnetic portion, and a second non-magnetic portion. The intensity of the magnetic field of the first magnetic drum separator 68 may be predetermined to efficiently separate particles which are +20 mesh in size into a magnetic portion having a minimum specified iron content, and a non-magnetic portion having an iron content less than the minimum specified iron content. The second magnetic drum separator 70 may be configured to separate the second sized group of particles, e.g., the minus 20 to +60 mesh sized group. The intensity of the magnetic field of the second magnetic drum separator 70 may be predetermined to efficiently separate particles which are minus 20 to +60 mesh in size into a magnetic portion having a minimum specified iron content, and a non-magnetic portion having an iron content less than the minimum specified iron content. As shown in the second example system 160 of FIG. 3, a third magnetic separator 72 may be used to separate the third sized group into a magnetic portion and a non-magnetic portion.

As used herein, a "magnetic portion" includes that portion of particles which have an iron content and/or magnetic susceptibility sufficient to be attracted and/or affected by the magnetic field of the magnetic separator such that they are diverted to and/or collected in a first portion, and the "non-magnetic portion" includes that portion of particles which have less than the iron content and/or magnetic susceptibility sufficient to be affected by the magnetic field of the magnetic separator such that they maintain a trajectory which is unaffected and/or minimally influenced by the magnetic field of the separator and as such are collected in a second portion. It would be understood that the terms "magnetic portion" and "non-magnetic portion" are relative to the particular setting or configuration of the magnetic separator through which the particles are processed. For example, the first magnetic drum separator 68 may be configured to separate particles having a minimum iron content of 27% total iron by weight. In this instance, the magnetic portion separated by the magnetic drum separator 68 would include particles having a minimum iron content of 27%, and the non-magnetic portion would include particles having an iron content of less than 27% which may include weakly magnetic and/or substantially non-ferrous particles. Another magnetic drum separator, for example, magnetic drum separator 70, may be configured to separate particles having a minimum iron content of 88% total iron by weight. In this instance, the magnetic portion separated by the magnetic drum separator 70 would include particles having a minimum iron content of 88% which may substantially include strongly magnetic particles, and the non-magnetic portion would include particles having an iron content of less than 88% which may include moderately and/or weakly magnetic particles.

Referring again to FIGS. 2 and 3, the first sized group of +20 mesh particles is magnetically separated into a magnetic portion and a non-magnetic portion using the drum separator 68, such that the non-magnetic portion is characterized by less than W % total iron content by weight, where W % total iron content material would be generally considered to be low iron material. In one example, low iron material is characterized by having less than 27% total iron content, and the drum separator 68 is configured to separate particles having less than 27% total iron content into the non-magnetic portion. The non-magnetic portion is collected as a finished product 30 having a low iron content, which may also be referred to herein as low iron fines and/or a finished low iron product. The finished low iron product 30 may generally have an iron content of less than 30% total iron content by weight, or be of sufficiently low iron content such that the low iron product is suitable for use in applications requiring low ferrous content, such as in the cement industry, or for clinker manufacturing, or be of sufficiently low iron content such that the product is not suitable for use as charge in an iron or steel refining operation. The magnetic portion discharged from the drum separator 68 is collected for further size reduction in a size reducing step 20. This magnetic portion may be characterized by greater than W % total iron content by weight, where in one example W % is 27%.

The second sized group of minus 20 to +60 mesh particles is magnetically separated into a magnetic portion and a non-magnetic portion using the drum separator 70, such that the non-magnetic portion is characterized by less than W % total iron content by weight, where W % total iron content material would be generally considered to be low iron material. In one example, the drum separator 70 is configured to separate particles having less than 27% total iron content into the non-magnetic portion. The non-magnetic portion is collected as finished low iron product 30, as previously described. The magnetic portion discharged from the drum separator 70 is collected for further size reduction in the size reducing step 20. This magnetic portion may be characterized by greater than W % total iron content by weight, where in one example W % is 27%.

In the first example process 60 shown in FIG. 2, the third sized group of minus 60 mesh particles is collected as finished low iron product 30. In the second example process 160 shown in FIG. 3, the third sized group of minus 60 mesh particles is magnetically separated into a magnetic portion and a non-magnetic portion using the drum separator 72, such that the non-magnetic portion is characterized by less than W % total iron content by weight, where W % total iron content material would be generally considered to be low iron material. In one example, the drum separator 72 is configured to separate particles having less than 27% total iron content into the non-magnetic portion. The non-magnetic portion is collected as finished low iron product 30, as previously described. In one configuration of system 160, the magnetic portion discharged from the drum separator 72 is collected for further magnetic separation using another drum separator, such as the drum separator 84 shown in FIG. 3. This magnetic portion may be characterized by greater than W % total iron content by weight, where in one example W % is 27%. In another configuration of system 160, the magnetic portion discharged from drum separator 72 is collected for further size reduction in the size reducing step 20.

The size classifying step 16 and the magnetic separation step 18 may be collectively referred to as a first classifying/separating phase, or a first phase of the method 10, wherein the first phase consists of size classifying the incoming material into a plurality of sized groups at step 16, and subsequently at step 18 magnetically separating each of the plurality of sized groups into a magnetic portion and a non-magnetic portion, as those terms are described herein.

Other types of permanent magnetic separators may be used in the first phase to perform the magnetic separation step 18. For example, one or more of the permanent magnetic separators may be a belt-type separator. In one example, at least one of the magnetic separators 68, 70, 72 may be a magnetic conveyor belt separator including a magnetic array providing a magnetic field exerting a magnetic force on the material, e.g., the feedstock, as the feedstock exits the end of the conveyor belt thereby affecting the trajectory of the magnetic particles in the feedstock as they fall from the end of the conveyor belt, such that these may be separated in to a magnetic portion. In one example, at least one of the magnetic separators 68, 70, 72 may be a configured as a cross-belt magnetic separator, wherein the feedstock or incoming material is fed on a first conveyor, also referred to as a feed conveyor, which is perpendicular to and at a specific distance from a second conveyor which is a magnetic conveyor housing a magnetic array. Magnetic particles on the feed conveyor surface (separating surface) of sufficient susceptibility and/or iron content to be attracted by the magnetic field provided by the magnetic array are attracted to and retained by the magnetic belt and collected from the magnetic belt as a magnetic portion.

At step 20, magnetic portions separated and collected at step 18 are reduced in size and/or crushed using a crushing system or device 74, which may liberate iron particles or iron rich particles from slag material in the magnetic portions. Because iron is more malleable than the slag material which may be adhering to or surrounding the iron particles in the magnetic portion, crushing or grinding the magnetic portions using the crushing device 74 causes fracture and separation of the brittle slag portion from the more malleable iron containing particles, liberating the iron containing particles. In systems 60, 160, the magnetic portions having a particle size of +60 mesh, e.g., the magnetic portions collected from the magnetic drum separators 68, 70, are fed into a crushing device 74 for crushing and/or reduction to a finer size. In an optional configuration of system 160, the magnetic portions collected from each of the magnetic drum separators 68, 70, 72, are fed into the crushing device 74. The crushing device 74 may be configured as a ball mill, which may be charged with steel balls to crush or grind the particles of the magnetic portions to a finer size. The crushing device 74 may crush or grind the particles to fracture or separate non-magnetic material such as slag from the particles, thereby yielding finer particles having an increased iron content. Other configurations of crushing devices 74 may be used to liberate the iron from the slag or non-magnetic portion of the material, including pebble mills, semi-autogenous grinding mills, rod mills, hammer mils, roller mills and the like. The crushed material is discharged from the crushing device 74 and fed to a classifying step 22.

A classifying system or device 76 may be used at step 22 to separate the fines, e.g., the fine product included in the crushed material discharged from the crushing device 74. The classifying system may be configured as an air to air classifier 76 in fluid communication with a cyclone 78. As the crushed product is classified by the air classifier 76, the fine product is discharged from the air to air classifier 76 to the cyclone 78, and discharged from the bottom of the cyclone 78 to be collected as finished low iron product 30. The coarser product not discharged to the cyclone 78 is collected and fed to a second phase size classifying step 24.

At step 24, the coarser crushed material is separated using a size classifying process into a plurality of sized groups, such that each sized group generated by the size classifying step 24 is comprised of particles within a specified size range. The size classifying step 24, which may also be referred to as the second phase classifying step, may be performed using a screening system 82, 182 (see FIGS. 2 and 3), which may be configured to separate the coarser crushed material into a plurality of sized groups. For example, the screening system 82, 182 may include a double deck vibratory screen, e.g., the screening system 82, 182 may include a first and a second screen arranged such that the incoming material from the air classifier 76 is fed to a first screen which retains particles in a first sized group and passes particles smaller than the first screen to the second screen. The second screen retains particles in a second sized group, and passes particles smaller than the second screen to be collected as a third sized group. Each of the differently sized groups may be separately fed to a magnetic separation step 26 for further processing, as described herein.

In a non-limiting example, the first screen of the double deck screening system 82, 182 which may also be referred to as the first deck, may be a 20 mesh screen, such that the first screen scalps off, e.g., screens or separates off, a first sized group substantially containing particles larger than +20 mesh from the raw material, and passes the remaining raw material, which may also be referred to as a remainder, to the second screen. In the example system 60 shown in FIG. 2, the second deck screen may be a 40 mesh screen, such that a second sized group substantially containing particles which range from minus 20 mesh to +40 mesh is scalped off using the second screen, and the remaining raw material is passed through the second screen and collected as a third sized group. The third sized group includes particles which are minus 40 mesh in size. In the example system 160 shown in FIG. 3, the second deck screen may be a 60 mesh screen, such that a second sized group substantially containing particles which range from minus 20 mesh to +60 mesh is scalped off using the second screen, and the remaining raw material is passed through the second screen and collected as a third sized group. The third sized group includes particles which are minus 60 mesh in size.

At step 26, each of the sized groups may be further separated using a magnetic separation process. The magnetic separation step 26 may be performed, as shown in FIGS. 2 and 3, using a plurality of magnetic separating devices 80, 84, 86, of which one or more may be configured as adjustable magnetic separators such that the intensity of the magnetic field at the separating surface of the separator may be varied to optimize separation of the incoming material into two portions of predetermined iron content and/or magnetic susceptibility. One or more of the adjustable magnetic separators 80, 84, 86 may be configured as adjustable magnetic drum separators and may include a permanent magnet or set of permanent magnets, which may be arranged as a magnetic array housed in the drum of the drum separator and configured such that the position of the magnetic array is adjustable with respect to the location of the drum surface, thereby changing the intensity of the magnetic field at the drum surface, e.g., at the separating surface. In one example, the position of the magnetic array relative to the separating surface may be adjusted using a mechanical mechanism. In another example, the location of the separating surface relative to the magnetic array may be modified, which may be performed by sleeving the drum to provide a secondary surface radially outward from the drum surface at which separation of the magnetic particles occurs. In another example, the position of the magnetic array and the location of the separating surface may each be modified relative to the other, to modify the intensity of the magnetic field at the separating surface, thereby modifying the specified iron content of the particles collected in the magnetic portion. The adjustable magnetic separators 80, 84, 86 may be configured such that the strength of the permanent magnetic elements of each of the magnetic separators 80, 84, 86 may differ, and such that the adjustable intensity range of the magnetic field as measured at the separating surface of each of the magnetic separators 80, 84, 86 may differ.

Referring again to FIGS. 2 and 3, the first sized group of +20 mesh particles is magnetically separated into a magnetic portion having a predetermined iron content of at least X %, and a non-magnetic portion having a predetermined iron content of less than X % using the adjustable magnetic separator 80, such that the magnetic portion is characterized by a high iron content of at least X %. In one example, the first sized group may be separated to provide a magnetic portion at least 85% total iron content by weight, e.g., the predetermined value of X would be 85. In another example, the adjustable magnetic separator 80 may be configured to separate a magnetic portion having at least 88% total iron content by weight. The magnetic portion is collected as a finished product 50 having a high iron content of at least X %, which may also be referred to herein as finished high iron product, or primary product. The finished high iron product 50 discharged from the adjustable separator 80 may be collected and/or stored separately from other high iron products, as a size classified high iron product having a particle size of +20 mesh, indicated at 50A in FIG. 2. The non-magnetic portion discharged from the adjustable separator 80 is collected for further size reduction in the size reducing step 20. This non-magnetic portion may be characterized by less than X % total iron content by weight, and is returned to the ball grinder 74 for further particle size reduction and/or to increase the iron content of the particles by removal of non-ferrous slag material from the particles.

In the example system 60 of FIG. 2, the second sized group of minus 20 to +40 mesh particles is magnetically separated into a magnetic portion having a predetermined iron content of at least X %, and a non-magnetic portion having a predetermined iron content of less than X % using the adjustable magnetic separator 86, such that the magnetic portion is characterized by a high iron content of at least X %. In one example, the second sized group may be separated to provide a magnetic portion at least 85% total iron content by weight, e.g., the predetermined value of X would be 85. In another example, the adjustable separator 86 may be configured to separate a magnetic portion having at least 88% total iron content by weight. The magnetic portion is collected as a finished high iron product 50 having an iron content of at least X %. The finished high iron product 50 discharged from the adjustable separator 86 may be collected and/or stored separately from other high iron products, as a size classified high iron product having a particle size of minus 20 to +40 mesh, indicated at 50B in FIG. 2. The non-magnetic portion discharged from the adjustable separator 86 is collected for further size reduction in the size reducing step 20. This non-magnetic portion may be characterized by less than X % total iron content by weight, and is returned to the ball grinder 74 for further particle size reduction and/or to increase the iron content of the particles by removal of non-ferrous slag material from the particles.

In the example system 160 of FIG. 3, the second sized group of minus 20 to +60 mesh particles is magnetically separated into a magnetic portion having a predetermined iron content of at least X %, and a non-magnetic portion having a predetermined iron content of less than X % using the adjustable magnetic separator 86, such that the magnetic portion is characterized by a high iron content of at least X %. In one example, the second sized group may be separated to provide a magnetic portion at least 85% total iron content by weight, e.g., the predetermined value of X would be 85. In another example, the adjustable separator 86 may be configured to separate a magnetic portion having at least 88% total iron content by weight. The magnetic portion is collected as a finished high iron product 50 having an iron content of at least X %. The finished high iron product 50 discharged from the adjustable separator 86 may be collected and/or stored separately from other high iron products, as a size classified high iron product having a particle size of minus 20 to +60 mesh, indicated at 50C in FIG. 3.

Still referring to system 160 of FIG. 3, the non-magnetic portion discharged from the magnetic separator 86 is collected for further magnetic separation in one or more operations at step 28. Referring to FIG. 3, step 28 may include a first magnetic separation using a magnetic separator 88, and a second magnetic separation of the non-magnetic material discharged from separator 88 using a magnetic separator 90. By way of example, the separator 88 may be configured as an adjustable magnetic drum separator, and the separator 90 may be configured as a fixed permanent magnetic drum separator. The non-magnetic portion discharged from the adjustable separator 86 may be fed into the adjustable magnetic drum separator 88, wherein the separator 88 is configured to magnetically separate the incoming material into a magnetic portion having a predetermined iron content of at least Y %, and a non-magnetic portion having a predetermined iron content of less than Y %, such that the magnetic portion is characterized by a medium iron content of at least Y %. In one example, the magnetic portion may be at least 55% total iron content by weight, e.g., the predetermined value of Y would be 55. In another example, the adjustable separator 88 may be configured to separate a magnetic portion having at least 60% total iron content by weight. In another example, the adjustable separator 88 may be configured to separate a magnetic portion having an iron content of at least Y % corresponding to a predetermined specific gravity, wherein the magnetic portion is collected for use in an application requiring material having the predetermined specific gravity, such as a counterweight or filler material application. The magnetic portion is collected as a finished product 40 having a medium iron content of at least Y %, which may also be referred to herein as finished medium iron product or secondary product.

The finished high iron product 50 and finished medium iron product 40 may collectively be referred to herein as iron rich product, or finished iron rich product. The finished iron rich product may be suitable, for example, as charge in an iron or steel refining or processing operation, such as a blast furnace, a sintering plant, an electric arc furnace, foundry, or ferro-alloy production process. Consumers of the finished iron rich product may include consumers of conventional pig iron and scrap.

Still referring to system 160, the non-magnetic portion discharged from the separator 88 is fed into the magnetic drum separator 90 and is magnetically separated into a magnetic portion having a predetermined iron content of at least Z %, and a non-magnetic portion having a predetermined iron content of less than Z %. In one example, the magnetic portion is characterized by an iron content of at least 20% total iron by weight, e.g., the predetermined value of Z is 20. The magnetic portion discharged from separator 90 is returned to the ball grinder 74 for further particle size reduction and/or to increase the iron content of the particles by removal of non-ferrous slag material from the particles. The non-magnetic portion is collected as finished low iron product 30, as previously described. Finished low iron product 30 may be suitable, for example, for use in one or more specialty applications such as blasting media, industrial absorbent, acid mine drainage neutralizer, acid mine land recovery, road traction media, and salt additive. Other applications for finished low iron product 30 may include constituent material for cement and hot mix asphalt, use as a lime replacement, iron additive or skid resistance additive, agricultural lime replacement, or in landfills as groundcover material or roadway material.

Referring again to systems 60, 160 of FIGS. 2 and 3, the third sized group particles from the screening step 24 is fed into the adjustable magnetic separator 84 for magnetic separation into a magnetic portion and a non-magnetic portion. The magnetic portion discharged from the fixed magnetic separator 72 may be fed into the adjustable magnetic drum separator 84, with the third sized group from the screening step 24, or separately, as its own sized group. The adjustable separator 84 is configured such that the incoming material is separated into a magnetic portion having a predetermined iron content of at least Y %, and a non-magnetic portion having a predetermined iron content of less than Y %, such that the magnetic portion is characterized by a medium iron content of at least Y %. In one example, the magnetic portion may be at least 55% total iron content by weight, e.g., the predetermined value of Y would be 55. In another example, the adjustable drum separator 84 may be configured to separate a magnetic portion having at least 60% total iron content by weight. The magnetic portion is collected as a finished medium iron product 40 having a medium iron content of at least Y %. Finished medium iron product 40 may be suitable, for example, for use in one or more specialty applications such as counterweight material or applications in the coal processing industry. The non-magnetic portion discharged from the separator 84 is collected as finished low iron product 30.

The size classifying step 24 and the magnetic separation steps 26, 28 may be collectively referred to as a second classifying/separating phase, or second phase of the method 10, wherein the second phase consists of size classifying the incoming material at step 24 into a plurality of sized groups, and subsequently at steps 26, 28 magnetically separating each of the plurality of sized groups into a magnetic portion and a non-magnetic portion, as those terms are described herein.

Other types of adjustable magnetic separators may be used in the second phase to perform the magnetic separation step 26. For example, one or more of the adjustable magnetic separators may be a belt-type separator. In one example, at least one of the magnetic separators 80, 84, 86, 88 may be a magnetic conveyor separator including an adjustable magnetic array providing a magnetic field exerting a magnetic force on the material, e.g., the feedstock, as the feedstock exits the end of the conveyor belt thereby affecting the trajectory of the magnetic particles in the feedstock as they fall from the end of the conveyor belt, such that these may be separated into a magnetic portion. The position of the magnetic array may be adjustable with respect to the end surface of the conveyor belt, such that the intensity of the magnetic force at the point of separation may be varied. In one example, at least one of the adjustable magnetic separators 80, 84, 86, 88 may be a configured as an adjustable cross-belt magnetic separation, wherein the feedstock or incoming material is fed on a first conveyor, which may be referred to as a feed conveyor, which is perpendicular to and at a specific distance from a second conveyor configured as a magnetic conveyor housing a magnetic array. Magnetic particles on the feed conveyor surface (separating surface) of sufficient susceptibility and/or iron content to be attracted by the magnetic field provided by the magnetic array are attracted to and retained by the magnetic belt and collected from the magnetic belt as a magnetic portion. The position of the magnetic array from the feed conveyor surface may be adjustable such that the intensity of the magnetic field provided by the magnetic array may be varied as measured at the separating surface, to modify the minimum iron content of the particles which are attracted to and/or retained by the magnetic belt and separated as a magnetic portion.

The intensity of the magnetic field as measured at the separating surface will be dependent upon the magnetic strength of the magnetic array, and the distance between the magnetic array and the separating surface, e.g., the drum or belt surface. The intensity of the magnetic field as measured at the separating surface decreases, e.g., weakens, as the magnetic array is retracted or moved away from the separating surface. A relatively lower intensity magnetic field as measured at the separating surface may be used to attract particles with high magnetic susceptibility including particles which may have relatively higher iron content. The intensity of the magnetic field at the separating surface increases, e.g., strengthens, as the magnetic array approaches or is moved closer to the separating surface. A relatively higher intensity magnetic field may be used to attract particles with lower magnetic susceptibility including particles which may have relatively moderate, e.g., medium, or lower iron content. By adjusting the distance between the magnetic array and the separating surface, the magnetic separator may be adjusted to separate magnetic particles having a predetermined iron content from the incoming material. Therefore, an adjustable magnetic separator may be adjusted and/or configured to provide the different configurations of the separators 80, 84, 86, and 88, and may be configurable as one or more of the separators 68, 70, 72, and 90 of the system 60, thus providing significant flexibility to the system 60, for example, by being able to configure the adjustable magnetic separator as any one of the separators in the system 60, thereby minimizing the amount of back-up equipment required to maintain system uptime. For example, the position of the magnetic array in the separator 86 may be changed from a first position suitable for separating high iron content material to a second position wherein the intensity of the magnetic field at the separation surface is increased, such that separator 86 can be substituted for separator 88 to separate a magnetic portion having a medium iron content, in the event separator 88 becomes unavailable due to maintenance, etc.

Other configurations of the systems and method described herein are possible, and the examples provided herein are not intended to be limiting. The raw material processing method and system as described herein may be applied, for example, to other forms of raw material or aggregate material having an iron or otherwise magnetic metal content, which may include iron ore, dross, tailings, etc. The example sized groups of +20 mesh, minus 20 to +40 mesh, minus 20 to +60 mesh, and minus 60 mesh are not intended to be limiting. The number of sized groups and the particle size range of each of the sized groups may be varied based on the particle size distribution of the incoming material, to optimize the efficiency of the magnetic separation. For example, in the first classifying/separating phase, the incoming material may be separated into four sized groups at the size classifying step 16, which may include a first screening of the raw material to remove significantly oversized material for further crushing. The first screening may be performed, for example, by passing the raw material through a grate or screening device of sufficient size to retain the oversized material in a fourth sized group. The incoming material may be characterized by an absence of larger particles or by a narrow size distribution of particles, such that classification into two sized groups prior to magnetic separation may be sufficient to provide an efficient and effective magnetic separation step. In the second classifying/separating phase the incoming material may be separated into two, three, four or more groups, to facilitate separation into by-products having discrete ranges of iron content and/or particle size.

Types of magnetic separation other than dry magnetic drum separators may be used, including for example, belt-type magnetic separators including magnetic conveyors and cross-conveyor separators may be substituted for drum-type magnetic separators, and adjustable magnetic separators may be substituted for fixed magnetic separators. Fixed magnetic separators may be substituted for one or more adjustable magnetic separators. Size classifying processes other than screening may be used, including for example, air classification. Other types of crushing and/or grinding devices may be used to liberate iron from slag and/or reduce the size of the particles in step 20, such as rod mills, pebble mills, semi-autogenous grinding mills, hammer mills, roller mills, rod mills, etc. The method may include additional steps, such as crushing the incoming raw material prior to the first phase size classifying step 16, to increase the effectiveness of the screening operation and/or separation of the incoming raw material into a plurality of sized groups. The material output from one operation may be fed directly and/or continuously to a subsequent operation, or may be collected and stored after an operation, then retrieved from storage and fed into a subsequent operation. The material may be stored in collection containers between operations, or remotely stored between operations. The systems 60, 160 may include material handling and storage equipment not shown, but understood as necessary to transport the material from one operational step to another or from one device to another. The material handling and storage equipment may include, for example, trucks including open gate dump style trucks, bulk pneumatic trailers, storage silos, sheds, front end loaders, conveyors including screw conveyors, elevators including bucket elevators, bins, hoppers, rotary air lock feeders, feed tubes, etc.

While the best modes for carrying out the invention have been described in detail, those familiar with the art to which this invention relates will recognize various alternative designs and embodiments for practicing the invention within the scope of the appended claims.

The invention claimed is:

1. A method for separating slag material, the method comprising:
   size classifying the slag material into a first plurality of sized groups;
   magnetically separating at least one of the first plurality of sized groups to provide a first magnetic portion and a first non-magnetic portion, wherein the first non-magnetic portion is a finished low iron product;
   reducing the size of at least a portion of the slag material of the first magnetic portion to provide crushed material;
   size classifying the crushed material into a second plurality of sized groups;
   magnetically separating each of the second plurality of sized groups to provide a second magnetic portion and a second non-magnetic portion wherein the second magnetic portion includes an iron rich product.

2. The method of claim 1, wherein the iron rich product is a finished high iron product.

3. The method of claim 1, wherein the iron rich product is a finished medium iron product.

4. The method of claim 1, wherein an adjustable magnetic separator is used to magnetically separate at least one of the second plurality of sized groups.

5. The method of claim 1, wherein the adjustable magnetic separator is configured as a permanent magnetic separator.

6. The method of claim 1, wherein the adjustable magnetic separator is configured as a magnetic drum separator.

7. The method of claim 1, wherein the adjustable magnetic separator is configured as a cross-belt magnetic separator.

8. The method of claim 1, further comprising:
   magnetically separating the second non-magnetic portion of at least one of the second plurality of sized groups to provide a third magnetic portion and a third non-magnetic portion, wherein the third magnetic portion is a finished high iron product.

9. The method of claim 8, wherein an adjustable magnetic separator is used to magnetically separate the second non-magnetic portion.

10. The method of claim 8, further comprising:
    magnetically separating the third non-magnetic portion to provide a fourth magnetic portion and a fourth non-magnetic portion, wherein the fourth magnetic portion is a finished medium iron product.

11. The method of claim 10, wherein an adjustable magnetic separator is used to magnetically separate the third non-magnetic portion.

12. The method of claim 10, further comprising:
    magnetically separating the fourth non-magnetic portion to provide a fifth magnetic portion and a fifth non-magnetic portion, wherein the fifth non-magnetic portion is a finished low iron product.

13. The method of claim 1, further comprising:
    separating the crushed material prior to size classifying the crushed material to remove fine product from the crushed material, wherein the fine product is a finished low iron product.

14. The method of claim 13, wherein separating the crushed material includes classifying the crushed material using an air classifier.

15. The method of claim 1, further comprising:
    magnetically separating the first magnetic portion of one of the first plurality of sized groups to provide a finished medium iron product and a finished high iron product.

16. The method of claim 1, further comprising:
    combining a portion of the second non-magnetic portion with the first non-magnetic portion; and
    reducing the size of the combined portion of the second non-magnetic portion to provide crushed material.

17. The method of claim 1, further comprising:
    drying the slag material at an elevated temperature to liberate iron containing particles in the slag material.

18. A system for separating slag material, the system comprising:
    at least one size classifying device configured to separate slag material into a plurality of sized groups;
    at least one magnetic separator configured to separate slag material into a magnetic portion and a non-magnetic portion; and
    a size reducing device configured to reduce the size of the slag material;
    wherein the at least one size classifying device, at least one magnetic separator, and at least one size reducing device are further configured to:

in a first phase, size classify slag material into a first plurality of sized groups and magnetically separate at least one of the first plurality of sized groups using the at least one magnetic separator to provide a first magnetic portion and a first non-magnetic portion, wherein the first non-magnetic portion is a finished low iron product;

reduce the size of the slag material of at least a portion of the first magnetic portion using the size reducing device to provide crushed material to a second phase; and in the second phase, size classify the crushed material into a second plurality of sized groups and magnetically separate each of the second plurality of sized groups using the at least one magnetic separator to provide a second magnetic portion and a second non-magnetic portion wherein the second magnetic portion includes an iron rich product.

19. The system of claim 18, further comprising:

an air classifier configured to separate fine material from the crushed material.

20. The system of claim 18, further comprising:

a dryer configured to heat the slag material to an elevated temperature to liberate iron containing particles in the slag material.

21. The system of claim 18, wherein:

in the first phase, the at least one magnetic separator is configured as a fixed permanent magnet separator; and in the second phase, the at least one magnetic separator is configured as an adjustable magnet separator.

22. The system of claim 18, wherein the at least one magnetic separator is configured as a permanent magnet drum separator.

* * * * *